United States Patent [19]
McMahon et al.

[11] Patent Number: 4,983,296
[45] Date of Patent: Jan. 8, 1991

[54] PARTIAL OXIDATION OF SEWAGE SLUDGE

[75] Inventors: Matthew A. McMahon; Robert M. Suggitt, both of Wappingers Falls; Ronald J. McKeon, Beacon; Albert Brent, Floral Park, all of N.Y.

[73] Assignee: Texaco Inc., White Plains, N.Y.

[21] Appl. No.: 389,435

[22] Filed: Aug. 3, 1989

[51] Int. Cl.⁵ .................. C02F 11/06; C10J 3/46
[52] U.S. Cl. ................... 210/603; 210/761; 210/769; 210/774; 210/806; 44/605; 44/280; 48/197 A
[58] Field of Search ............... 210/603, 609, 612, 613, 210/620-622, 631, 712, 713, 716, 721, 724, 726, 737, 738, 748, 754-756, 758, 761, 765, 766, 768-771, 774, 805, 806; 55/68, 69; 44/50, 51, 90, 60 S; 48/197 R, 197 A, 202, 210; 110/346

[56] References Cited

U.S. PATENT DOCUMENTS

| Re. 29,312 | 7/1977 | Mallon et al. | 48/202 X |
|---|---|---|---|
| 3,507,788 | 4/1970 | Cole et al. | 210/761 |
| 3,687,646 | 8/1972 | Brent et al. | 48/209 |
| 3,961,913 | 6/1976 | Brenneman et al. | 44/51 X |
| 4,052,176 | 10/1977 | Child et al. | 48/197 R |
| 4,074,981 | 2/1978 | Slater | 48/197 R |
| 4,203,838 | 5/1980 | Shimizu et al. | 210/761 X |
| 4,251,227 | 2/1981 | Othmer | 48/197 R |
| 4,409,102 | 10/1983 | Tanner | 210/603 |
| 4,543,190 | 9/1985 | Modell | 210/721 |
| 4,597,773 | 7/1986 | Quintana et al. | 48/197 R |
| 4,618,735 | 10/1986 | Bridle et al. | 48/197 A |
| 4,762,527 | 8/1988 | Beshore et al. | 44/51 |

Primary Examiner—Tom Wyse
Attorney, Agent, or Firm—Robert A. Kulason; James J. O'Loughlin; Albert Brent

[57] ABSTRACT

Municipal sanitary sewage sludge is disposed of by an improved partial oxidation process without polluting the environment. Aqueous slurries of sewage sludge are upgraded by hydrothermal treatment, preferably while being sheared, concentrated, and then mixed with a supplemental fuel, preferably coal. A pumpable aqueous slurry of sewage sludge-coal and/or petroleum coke is thereby produced having a greater total solids and heat content (HHV) as well as containing an increased amount of sewage sludge for reacting with free-oxygen containing gas in a free-flow partial oxidation gas generator. Hot quench water or steam produced by cooling the hot raw effluent stream of synthesis gas, reducing gas or fuel gas from the gasifier may provide heat for the hydrothermal step.

41 Claims, 1 Drawing Sheet

PARTIAL OXIDATION OF SEWAGE SLUDGE

BACKGROUND OF THE INVENTION

1. Field of the Invention

This invention relates to a partial oxidation process for disposing of biological sewage sludge without polluting the nation's environment.

2. Description of the Prior Art

The term "sewage" as used herein may be broadly defined as "water-carried wastes," particularly from municipal sanitary sewage lines containing body wastes (excreta), household wastes, community waste such as street washings, etc., and some industrial wastes. The total solids content of the sewage in municipal lines is usually about 500 parts per million (p.p.m.) or more. The solids in sewage are mostly animal or vegetable substances, "organic matter," i.e. fats, carbohydrates, and proteins. Some mineral or inorganic constituents present include sand and clay, as well as the common mineral salts found in the water supply. Sewage sludge may contain a number of pathogens known to be health hazards to humans. Almost any type of organism may be found in sewage including bacteria, protozoa, spores and cysts.

When sewage is introduced directly into streams, nuisance results from the putrefactive decomposition of the aforesaid organic matter. This biochemical decomposition produces substances which quickly consume the dissolved oxygen in the water, causing the death by suffocation to practically all of the higher animals such as fish. Objectionable gases may also be produced, and there is the possibility of disease if pathogenic bacteria is present. The consumption of oxygen by sewage is called the "biochemical oxygen demand" or "BOD." BOD tests denote the amount of oxygen consumed by bacterial activity under standard sampling and test conditions, i.e. Standard Methods American Public Health Association. On the other hand, the term "chemical oxygen demand" or "COD" denotes the total oxidizable material present in the waste liquid regardless of whether or not it is biodegradable. COD may be determined by ASTM Test Method D 1252-67. Although the BOD and COD of a sample of waste material are not comparable in all respects, generally a reduction in COD would indicate a reduction in BOD.

Typical Chemical Composition, Ultimate Analysis of Combustibles, and Analysis of Inert Materials In Primary Sewage Sludge are shown respectively in Tables I, II and III.

TABLE I

TYPICAL CHEMICAL COMPOSITION OF UNTREATED PRIMARY SEWAGE SLUDGE

| Item | Range |
|---|---|
| Total dry solids (TS), wt % | 0.5–8.0 |
| Volatile solids (% of TS) | 60–80 |
| Grease and fats (ether-soluble, % of TS) | 6.0–30.0 |
| Protein (% of TS) | 20–30 |
| Nitrogen (% of TS) | 1.5–6.0 |
| Phosphorus ($P_2O_5$, % of TS) | 0.8–3.0 |
| Potash ($K_2O$, % of TS) | 0–1.0 |
| Cellulose (% of TS) | 8.0–15.0 |
| Iron (not as sulfide) | 2.0–4.0 |
| Silica ($SiO_2$, % of TS) | 15.0–20.0 |
| pH | 5.0–8.0 |
| Alkalinity (mg/L as $CaCO_3$) | 500–1500 |
| Organic acids (mg/L as $HA_c$) | 200–2000 |
| Higher Heating Value BtU/lb | 4000–7000 |

TABLE II

TYPICAL ULTIMATE ANALYSIS OF COMBUSTIBLES IN PRIMARY SEWAGE SLUDGE

| ELEMENT | Wt. % |
|---|---|
| Carbon | 54.60 |
| Hydrogen | 7.90 |
| Nitrogen | 4.50 |
| Oxygen | 32.00 |
| Sulfur | 1.00 |

TABLE III

TYPICAL ANALYSIS OF INERT NON-COMBUSTIBLE MATERIALS IN PRIMARY SEWAGE SLUDGE

| ELEMENT | mg/kg DRY SOLIDS |
|---|---|
| Total Sodium | 1,515 |
| Water Soluble Sodium (mg/l) | 83 |
| Total Potassium | 800 |
| Water Soluble Potassium (mg/l) | 53 |
| Arsenic | 4.58 |
| Beryllium | 0.38 |
| Cadmium | 3.27 |
| Chromium | 244 |
| Copper | 289 |
| Iron | 150 |
| Lead | 147 |
| Zinc | 468 |
| Nickel | 63 |
| Mercury | 0.68 |

The most common ways of disposing of sewage sludge in the U.S. in 1984 were as follows: land applications including filling and burying—about 60 wt. %, incineration—about 20 wt. %, and ocean dumping—about 7 wt. %. Thousands of tons of sewage sludge are dumped into the ocean annually. For example, about 1500 dry tons of sludge were dumped in the ocean every day in 1988. Ocean dumping of sewage sludge is one of the major environmental problems of our large East Coast cities. A Federal ban enacted in 1988 prevents ocean dumping after Dec. 31, 1991. Until then, dumping fees from $100–$200 per dry ton will be charged based on the dry tonnage of sludge dumped at the disposal site, for example, in the Atlantic about 106 miles east of Cape May.

The amounts involved, shortage of land and high transportation costs, place future limitations on landfilling as a means for disposing of sludge. Incinerators have poor emissions characteristics, including soot and particulate matter, toxic gases e.g. dioxane, and foul odors. Air quality standards of federal and state environmental protection agencies while placing severe limitations on the use of incinerators can be readily met by the subject process.

To provide the sewage sludge feed in the subject process, raw municipal sanitary sewage is separated into sewage sludge and liquid. Any suitable way for separating solids and liquid may be used. For example, in coassigned U.S. Pat. No. 3,687,646, which is incorporated herein by reference, screening, gravity settling, filtration, centrifugation, expression pressing, and combinations thereof may be used. Heat treating sewage sludge is described in Wastewater Engineering Treatment- /Disposal/ Reuse, Metcalf and Eddy Inc., McGraw-Hill, 1979, pages 636-637. Coking sewage sludge is disclosed in coassigned U.S. Pat. No. 3,507,788. However, none of these references taken singly or in combination teach or suggest applicants' improved partial oxidation process for disposing of a pumpable slurry comprising coal or other fuel in admixture with an upgraded and agglomerated sewage sludge without contaminating the environment. Advantageously by the subject process, steam or hot water for use in the process, and valuable synthesis gas, reducing gas, or fuel gas are produced.

SUMMARY OF THE INVENTION

This relates to an improved partial oxidation process for disposing of sewage sludge without contaminating the environment comprising:

(1) heating a concentrated aqueous slurry of sewage sludge obtained from sewage and comprising combustible and non-combustible materials and having a solids content of at least 3 wt. % in the absence of air at a temperature in the range of about 200° F. to 600° F. and at a pressure at or above the vapor pressure of water at said elevated temperature until a large portion of the organic matter in said sewage is agglomerated;

(2) dewatering the heated aqueous pumpable slurry of sewage sludge from (1) to a solids content in the range of about 25 to 50 wt. %;

(3) mixing the pumpable aqueous slurry of sewage sludge produced in (2) having a higher heating value (HHV) of at least 3,000 Btu/lb (dry basis) with particles of a supplemental solid fuel comprising ash-containing coal and/or petroleum coke having a higher heating value (HHV) of at least about 8,000 Btu/lb (dry basis) to produce a pumpable aqueous sewage sludge-coal and/or petroleum coke slurry having a solids content in the range of about 30 to 65 wt. %, and having a higher heating value (HHV) of at least about 8,000 Btu/lb (dry basis); and (4) reacting said aqueous sewage sludge-coal and/or petroleum coke slurry from (3) in the reaction zone of a partial oxidation gas generator at a temperature in the range of about 1800° F. to 2800° F. and a pressure in the range of about 1-35 atmospheres, and in the presence of a free-oxygen containing gas, thereby producing a hot raw stream of synthesis gas, reducing gas or fuel gas. Non-combustible materials in the sewage sludge, such as heavy metals that could contaminate the land, become encapsulated in the coal ash and are thereby easily removed from the gasifier as inert molten slag. Optionally, acid gases may be removed from the raw gas stream by conventional gas purification steps.

Advantageously, waste heat from the partial oxidation gasifier may be used in the process to agglomerate the aqueous suspension of sewage sludge so that pumpable suspensions of coal and sewage sludge having a high solids content may be produced as feedstock to the gasifier. While undesirable hydrocarbon by-products are not formed in the subject process, undesirable hydrocarbons in waste streams are destroyed. Effluent streams may be treated by conventional methods and the slag produced is substantially inert in leaching tests. Further, valuable synthesis gas, reducing gas, or fuel gas is produced from waste streams of sewage sludge.

Another embodiment relates to a partial oxidation process for disposing of sewage sludge comprising: (1) heating a concentrated aqueous slurry to sewage sludge comprising combustible and non-combustible materials and having a solids content of at least 3 wt. % in the absence of air at a temperature in the range of about 200° to 600° F. and at a pressure at or above the vapor pressure of water at said elevated temperature until a large portion of the organic matter in said sewage is agglomerated;

(2) dewatering the heated aqueous pumpable slurry of sewage sludge from (1) to a solids content in the range of about 25 to 50 wt. %;

(3) mixing the pumpable aqueous slurry of sewage sludge produced in (2) having a higher heating value (HHV) of at least 3,000 Btu/lb (dry basis) with a supplemental fuel comprising a liquid hydrocarbon or liquid hydrocarbonaceous fuel having a higher heating value (HHV) of at least about 10,000 Btu/lb to produce a pumpable feed slurry having a solids content in the range of about 30 to 65 wt. %, and having a higher heating value (HHV) of at least about 6,000 Btu/lb (dry basis); and (4) reacting said pumpable feed slurry from (3) in the reaction zone of a partial oxidation gas generator at a temperature in the range of about 1800° F. to 2800° F. and a pressure in the range of about 1-35 atmospheres, and in the presence of a free-oxygen containing gas, thereby producing a hot raw stream of synthesis gas, reducing gas or fuel gas.

Still another embodiment relates to a partial oxidation process for disposing of sewage sludge comprising:

(1) heating a concentrated aqueous slurry of sewage sludge comprising combustible and non-combustible materials and having a solids content of at least 3 wt. % in the absence of air at a temperature in the range of about 200° to 600° F. and at a pressure above the vapor pressure of water at said elevated temperature until a large portion of the organic matter in said sewage is agglomerated;

(2) dewatering the heated aqueous pumpable slurry of sewage sludge from (1) to a solids content in the range of about 25 to 50 wt. %;

(3) mixing the pumpable aqueous slurry of sewage sludge least 3,000 Btu/lb (dry basis) with a supplemental fuel comprising a gaseous fuel having a higher heating value (HHV) of at least 75 Btu per Standard Cubic Foot (SCF) to produce a dispersion of sewage sludge in gaseous fuel, wherein said dispersion has a higher heating value (HHV) of at least 300 Btu/SCF; and (4) reacting said atomized dispersion from (3) in the reaction zone of a partial oxidation gas generator at a temperature in the range of about 1800° F. to 2800° F. and a pressure in the range of about 1-35 atmospheres, and in the presence of a free-oxygen containing gas, thereby producing a hot raw stream of synthesis gas, reducing gas or fuel gas.

BRIEF DESCRIPTION OF THE DRAWING

The invention will be further understood by reference to the accompanying drawing. The drawing is a schematic representation of a preferred embodiment of the process.

DESCRIPTION OF THE INVENTION

Municipal sanitary sewage sludge is disposed of by the process of the subject invention without polluting the nation's environment. In the subject process, upgraded hydrothermally treated, preferably while being sheared, and concentrated aqueous slurries of sewage sludge are mixed with a supplemental fuel selected from the group consisting of solid carbonaceous fuel e.g. coal and/or petroleum coke, liquid hydrocarbonaceous fuel, liquid hydrocarbon, and fuel gas and reacted with a free oxygen-containing gas by partial oxidation in a free-flow non-catalytic gas generator. The expression "and-/or" is used herein in its normal sense and for example means a material selected from the group consisting of coal, petroleum coke, and mixtures thereof. Simultaneously, profitable by-products are produced in the form of steam and hot water for use in the process or export, while useful nonpolluting synthesis gas, reducing gas, or fuel gas products are formed.

The sewage sludge feed in the process is produced by treating raw municipal sanitary sewage by conventional processing steps and equipment. For example, the sewage from the municipal sewage line is passed through bar screens for the removal of large pieces of stone, wood, metal, and other trash which would clog channels or damage pumps. Coarse heavy inorganic non-combustibles, i.e. gravel, cinders, sand are then settled out in a grit chamber. Dry sewage sludge is composed of about 55 to 75 wt. % of combustible materials, see Table II. The remainder substantially comprises non-combustible materials, see Table III.

The sewage is then separated into an aqueous suspension of sewage sludge and liquids. Concentration of the sewage may be accomplished by any suitable way for separating solids and liquids e.g. gravity settling, filtration, centrifugation, hydroclone, or a combination thereof. For example, a preferable preliminary procedure is to introduce the screened over-flow from the grit chamber into a primary sedimentation tank such as a continuous clarifier as shown in Perry's Chemical Engineer' Handbook, McGraw-Hill, Fourth Edition, 1963, page 19–50. Detention time in the sedimentation tank is sufficient for producing a pumpable aqueous slurry of primary sludge having a solids content of about 0.5 to 10 wt. % percent e.g. about 1 to 24 hours. The primary sedimentation tank may also serve as a hold-up tank to even out discontinuities in the sewage composition. Alternatively, a separate holding tank may be used. In a preferred embodiment, a pumpable aqueous slurry of secondary sewage sludge is introduced into the holding tank and mixed with the primary sewage sludge. Secondary sewage sludge has a solids content in the range of about 1 to 10 wt. % and is derived from the liquid overflow from the previously mentioned primary sedimentation tank. The liquid overflow is processed in a conventional manner in order to produce secondary sewage sludge, and to reduce the BOD and organic solids content and to purify and demineralize the waste water which is separated from the secondary sewage sludge. Treatment of the liquid overflow from the primary sedimentation tank may include a combination of any or preferably all of the following steps, depending upon the end use of the water: pH adjustment; reduction of organic solids and BOD to about 20 parts per million or below, preferably by aerated biochemical treatment; clarification, optionally with coagulation; filtration or centrifugation; demineralizing; activated carbon treatment; and disinfection to control bacteria for example by chlorination. Excessively acidic or basic waste waters may be neutralized and the pH adjusted to a level in the range of about 6 to 9. Anaerobic and aerobic biological treatment processes are preferably used to economically abate the bacterial oxygen-consuming pollution caused by the discharge of waste water contaminated with low concentrations of organic matter. Suitable conventional biological processes that may be used include activated sludge units, aerated stabilization basins, and trickling filters.

The pure water may be then used subsequently in the process. For example, it may be used as a coolant of the product gas by direct contact in a quench tank, or by indirect heat exchange in a waste heat boiler. By-product steam may be produced after dissolved solids are removed. The hot water or steam may be used for indirect heat exchange with other streams in the subject process. For example, to preheat and thereby agglomerate the aqueous suspension of sewage sludge in a manner to be further described. Excess water may be discharged from the system or used externally for industrial applications.

The sludge underflow from the primary sedimentation tank comprising primary sewage sludge or from the holding tank comprising primary sewage sludge in admixture with about 0 to 50 wt. % (basis total sewage sludge) of secondary sewage sludge may be dewatered further if necessary to produce a thickened aqueous suspension of sewage sludge having a solids content of at least 3.0 wt. %, such as in the range of about 10 to 25 weight percent. Further dewatering of the sludge to produce a pumpable aqueous slurry having a solids content in the range of about 25 to 50 weight percent is accomplished by the steps of (1) agglomerating, and (2) concentrating.

It was previously found that an aqueous suspension of sewage sludge having a solids content of about 20 wt. % when the aqueous sewage sludge slurry was mixed with particles of coal to form an aqueous sewage sludge-coal slurry having a solids content in the range of about 50 to 60 wt. %, the resulting slurry was so viscous that it could not be pumped with any degree of reliability.

However, this deficiency has now been overcome by the subject invention, for example by which a pumpable aqueous sewage sludge-coal and/or petroleum coke slurry having a high solids content and containing an increased amount of sewage sludge is produced. This is an economic advantage because the profit that can be made from the subsequent gasification of sewage sludge is determined by the percentage of sewage sludge in the aqueous slurry of sewage sludge-coal and/or petroleum coke. It was found that by heating a concentrated aqueous slurry of sewage sludge having a solids content of at least 3 wt %, such as about 10 to 25 wt. % for about 15 min. to 2 hrs. in the absence of air at a temperature in the range of about 200° F. to 600° F., such as about 250° F. to 350° F., at a pressure at or above the vapor pressure of water at said elevated temperature e.g. at a pressure of about 10 to 15 atmospheres, a large portion e.g. about 50 to 100 wt. %, or substantially all of the organic matter in said sewage sludge is agglomerated. The physical nature of the sewage sludge is changed by this hydrothermal treatment. For example, the gel structure is broken down and the water affinity of the sludge solids is reduced. Further, the sewage sludge is sterilized.

It is theorized that during the heating of the sewage, denaturation reactions occur and the organic hydrophilic sewage material is converted to a hydrophobic material.

The oxygen content of sewage sludge, which is usually associated with hydrophilicity decreases upon heating. This is shown by the data in Table IV below.

TABLE IV

EFFECT OF HEATING ON COMPOSITION OF SEWAGE SLUDGE WEIGHT PERCENT

| COMPONENT | AS REC'D | 1 Hour 250° F. | 1 Hour 325° F. | 1 Hour 500° F. |
|---|---|---|---|---|
| ASH | 36.3 | 38.0 | 47.38 | 54.0 |
| C | 31.2 | 30.54 | 29.1 | 31.54 |
| H | 4.84 | 4.78 | 4.39 | 3.85 |
| N | 3.92 | 3.98 | 2.84 | 2.12 |
| S | 1.66 | 1.68 | 2.07 | 2.26 |
| O | 22.08 | 21.52 | 14.22 | 5.93 |

When weak solid-water interfacial forces prevail, then the aqueous suspensions of sewage sludge may be easily dewatered further by conventional means. It was unexpectedly found that pumpable slurries are produced by the subject process that contain a relatively high solids content e.g. about 30 to 65 wt. % comprising for example coal and/or petroleum coke particles in admixture with the hydrothermally treated sewage sludge.

Shearing the sewage sludge at a minimum shear rate of about 1000 per minute for a period of about ¼ hr. to 2 hrs., while heating is more beneficial than either heating the sewage sludge or shearing alone. Increasing the amount of sewage sludge in the aqueous slurry of sewage sludge and coal by heating and shearing the sewage sludge is shown in Table V.

TABLE V

Effect Of Combined Heating And Shearing Of Sewage Sludge Prior To Mixing With Coal To Form A Pumpable Aqueous Slurry Of Sewage Sludge And Coal.

| Wt. % Sewage Sludge (Dry Basis) In Aqueous Slurry of Sewage Sludge And Coal | Treatment of Sewage Sludge Prior to Mixing With Coal | | | Total Solids In Aqueous Slurry Of Sewage Sludge And Coal At 1000 cp: Maximum Pumpable Slurry |
|---|---|---|---|---|
| | Temp °F. | Time Hr. | Shear Rate[1] Min$^{-1}$ | |
| 0 | — | None | — | 59.5 |
| 10 | — | None | — | 44.1 |
| 20 | — | None | — | 35 |
| 30 | — | None | — | 32 |
| 40 | — | None | — | 26 |
| 30 | 70 | 1 | 3400 | 34.5 |
| 30 | 250 | 1 | 3400 | 40.1 |
| 30 | 325 | 1 | 3400 | 54 |
| 30 | 500 | 1 | 3400 | 54 |
| 30 | 325 | 1 | None | 43 |
| 100 | 400 | 1 | 3400 | 22.5 |
| 100 | — | None | — | 15 |
| 100 | 70 | None | 3400 | 15 |

[1]Shear stress provided by stirring at 400 rpm in an autoclave.

Advantageously, in the subject process that provides for the hydrothermal treatment of the sewage sludge and the subsequent partial oxidation of the upgraded sewage sludge along with a supplemental fuel having a greater heat content than the sewage sludge e.g. preferably coal, waste heat in the effluent gas stream from the partial oxidation gasifier may be used to agglomerate the aqueous suspension of sewage sludge. For example, the hydrothermally treated, and thereby upgraded aqueous slurry of sewage sludge is produced by passing the pumpable concentrated aqueous slurry of sewage sludge in noncontact indirect heat exchange with a quench water dispersion at a temperature in the range of about 200° F. to 600° F. The quench water dispersion is obtained from the bottom of a quench tank, such as quench tank 20 used to quench cool the hot raw effluent gas stream from the gasifier, see drawing in coassigned U.S. Pat. No. 4,074,981, which is incorporated herein by reference. Alternatively, the pumpable concentrated aqueous slurry of sewage sludge may be heated with steam. Preferably, the steam may be obtained from a waste heat boiler used to cool the hot raw effluent gas stream from the gas generator. For example, high quality or superheated steam from said waste heat boiler may be introduced into a steam turbine to make mechanical power and/or electricity. Then, the low quality discharge steam leaving the steam turbine may be used in indirect heat exchange in the hydrothermal treatment of the concentrated aqueous slurry of sewage sludge.

After being agglomerated, the aqueous suspension of sewage sludge may be easily concentrated to a solids content in the range of about 25 to 50 weight percent and preferably to about 32 weight percent by conventional means, e.g. settler, centrifugation.

The comparatively low heat content (HHV) of the hydrothermally treated sewage sludge e.g. at least about 3,000 Btu/lb is increased by mixing it with particles of coal and/or other petroleum coke, or another supplemental fuel which has a higher heating value than the hydrothermally treated sewage sludge. For example, the supplemental fuel should have a higher heating value of at least about 8000 Btu/lb. The resulting mixture of coal and/or petroleum coke, or other fuel and sewage sludge should have a minimum higher heating value of at least about 6,000 Btu/lb.

The fuel feed to the partial oxidation gas generator comprises about 10 to 70 wt. %, such as about 25 to 60 wt. % of sewage sludge and the remainder comprises particulate coal and/or petroleum coke, or other fuel in which the heat content (HHV) is greater than that of the hydrothermally treated sewage sludge. The coal and/or petroleum coke have a particle size so that 100% passes through an ASTM E 11-70 Sieve Designation Standard (SDS) 1.40 mm Alternative No. 14, such as 425 μm Alternative No. 40. The term ash-containing coal includes anthracite, bituminous, subbituminous, coke from coal, lignite, residue derived from coal liquification, and mixtures thereof Petroleum coke is made from conventional delayed or fluid coking processes.

The pumpable aqueous slurry of sewage sludge and coal or other fuel which comprises the fuel feed to the partial oxidation gas generator may have a solids content in the range of about 30–65 wt. %, such as about 45–60 wt. %. This slurry feed may be prepared by mixing the following materials together using a conventional mixer, such as an in-line mixer: (1) a pumpable slurry of coal and/or petroleum coke in a liquid carrier selected from the group consisting of water, liquid hydrocarbon, liquid hydrocarbonaceous fuel, and mixtures thereof; and (2) an aqueous suspension of sewage sludge having a solids content in the range of about 25 to 50 wt. %. The coal and/or petroleum coke slurry has a solids content in the range of about 10 to 70 wt. %, such as about 25 to 50 wt. The liquid hydrocarbonaceous fuel slurrying medium in (1) may be selected from the group consisting of virgin crude, residue from petroleum distillation and cracking, petroleum distillates, reduced crude, whole crude, coal derived oil, and mixtures thereof.

Alternatively, the pumpable slurry feed to the gasifier having a solids content in the range of about 30–65 wt. % may be prepared at a great cost savings by grinding together in a conventional grinder, coal and/or petroleum coke and the hydrothermally treated and concentrated aqueous slurry of sewage sludge having a solids content in the range of about 25 to 50 wt. %. By this procedure, coal and/or petroleum coke and sewage sludge are simultaneously ground to the proper size as specified previously for coal and/or petroleum coke and mixed together. The coal and/or petroleum coke may be supplied in the dry form or entrained in a liquid carrier e.g. water, liquid hydrocarbonaceous fuel, or mixtures thereof.

In one embodiment, the supplemental fuel comprising coal and/or petroleum coke in the slurry feed to the gasifier comprising coal and/or petroleum coke and sewage sludge was replaced by a liquid hydrocarbon or a liquid hydrocarbonaceous fuel selected from the group consisting of virgin crude, residue from petroleum distillation and cracking, petroleum distillates, reduced crude, whole crude, coal derived oil, asphalt, coal tar, shale oil, tar sand oil, and mixtures thereof. The amount of liquid hydrocarbon e.g. waste streams of alcohols and/or aldehydes or liquid hydrocarbonaceous fuel is such that the aqueous slurry of hydrothermally treated sewage sludge and the liquid hydrocarbons or liquid hydrocarbonaceous fuel has a minimum heat content of about 8,000 Btu/lb.

The aqueous slurry of sewage sludge and coal and/or petroleum coke and a stream of free-oxygen containing gas are introduced into a free-flow unobstructed downflowing vertical refractory lined steel wall pressure vessel where the partial oxidation reaction takes place. A typical gas generator is shown and described in coassigned U.S. Pat. No. 3,544,291, which is incorporated herein by reference.

A three or four stream annular type burner, such as shown and described in coassigned U.S. Pat. Nos. 3,847,564, and 4,525,175, which are incorporated herein by reference, may be used to introduce the feedstreams into the partial oxidation gas generator. With respect to U.S. Pat. No. 3,847,564, free-oxygen containing gas may be simultaneously passed through the central conduit 18 and outer annular passage 14 of said burner. The free-oxygen containing gas is selected from the group consisting of substantially pure oxygen i.e. greater than 95 mole % $O_2$, oxygen-enriched air i.e. greater than 21 mole % $O_2$, and air. The free-oxygen containing gas is supplied at a temperature in the range of about 100° F. to 1000° F. The aqueous slurry of sewage sludge coal and/or petroleum coke or alternatively the pumpable aqueous slurry of sewage sludge and liquid hydrocarbon or liquid hydrocarbonaceous fuel is passed through the intermediate annular passage 16 at a temperature in the range of about ambient to 650° F.

The burner assembly is inserted downward through a top inlet port of the noncatalytic synthesis gas generator. The burner extends along the central longitudinal axis of the gas generator with the downstream end discharging a multiphase mixture of fuel, free-oxygen containing gas, and temperature moderator directly into the reaction zone.

The relative proportions of solid, liquid, or gaseous fuels, water and oxygen in the feedstreams to the gas generator are carefully regulated to convert a substantial portion of the carbon in the fuel e.g., up to about 90% or more by weight, to carbon oxides; and to maintain an autogenous reaction zone temperature in the range of about 1800° F. to 3500° F. Preferably the temperature in the gasifier is in the range of about 2200° F. to 2800° F., so that molten slag is produced. Further, the weight ratio of $H_2O$ to carbon in the feed is in the range of about 0.2 to 3.0, such as about 1.0 to 2.0. The atomic ratio of free-oxygen to carbon in the feed is in the range of about 0.8 to 1.4, such as about 1.0 to 1.2. Advantageously, the high amount of combined oxygen in the sewage sludge reduces the amount of free-oxygen.

The dwell time in the reaction zone is in the range of about 1 to 10 seconds, and preferably in the range of about 2 to 8 seconds. With substantially pure oxygen feed to the gas generator, the composition of the effluent gas from the gas generator in mole % dry basis may be as follows: $H_2$ 10 to 60, CO 20 to 60, $CO_2$ 5 to 40, $CH_4$ 0.01 to 5, $H_2S + COS$ 90 to 5, $N_2$ nil to 5, and Ar nil to 1.5. With air feed to the gas generator, the composition of the generator effluent gas in mole % dry basis may be about as follows: $H_2$ 2 to 20, CO 5 to 35, $CO_2$ 5 to 25, $CH_4$ 0 to 2, $H_2S + COS$ 0 to 3, $N_2$ 45 to 80, and Ar 0.5 to 1.5. Unconverted carbon, ash, or molten slag are contained in the effluent gas stream. Depending on the composition and use, the effluent gas stream is called synthesis gas, reducing gas, or fuel gas. Coal has a high ash content e.g. about 10 to 30 wt. %. It was unexpectedly found that advantageously when coal is used as the supplemental fuel the coal ash will encapsulate the noncombustible materials in the sewage sludge, and the encapsulated material will flow from the reaction zone of the gas generator as substantially inert molten slag.

The hot gaseous effluent stream from the reaction zone of the synthesis gas generator is quickly cooled below the reaction temperature to a temperature in the range of about 250° F. to 700° F. by direct quenching in water, or by indirect heat exchange for example with water to produce steam in gas cooler. The gas stream may be cleaned and purified by conventional methods. For example, reference is made to coassigned U.S. Pat. No. 4,052,176, which is included herein by reference for removal of $H_2S$, COS, and $CO_2$.

In another embodiment, the supplemental fuel is a fuel gas such as natural gas or a portion of the fuel gas e.g. gaseous mixture of $H_2$, CO and $CH_4$ that is produced downstream in the gas generator by the partial oxidation of the sewage sludge and fuel gas. An atomized dispersion of sewage sludge and fuel gas may be produced upstream from the burner or by impingement of the streams at the tip of the burner in the reaction zone. Such an atomized dispersion would have a higher heating value (HHV) of at least 300 Btu per Standard Cubic Foot.

For example, the aqueous sewage sludge slurry may be introduced into the gasifier by way of intermediate annular passage 16 of the previously described three stream annular type burner U.S. Pat. No. 3,847,564. Free-oxygen containing gas is passed through outer annular passage 14 or central conduit 18, and the fuel gas is passed through the remaining passage. Alternatively, a free-oxygen containing gas may be passed through central conduit 18 and outer annular passage 14, and a gaseous dispersion of sewage sludge entrained in the fuel gas is passed through the intermediate annular passage 16.

In one embodiment, an additive is introduced into the partial oxidation reaction zone along with the other feed materials in order to facilitate the encapsulation and removal as inert molten slag of the non-combustible materials found in the sewage sludge and in the ash of the supplemental fuel. The additive is selected from the group consisting of iron-containing material, calcium-containing material, silicon-containing material and mixtures thereof. About 0.1 to 10 parts by weight of additive is introduced into the gasifier for each part by weight of non-combustible materials. The iron-containing additive material is for example selected from the group consisting of iron, iron oxide, iron carbonate, iron nitrate, and mixtures thereof. The calcium-containing additive material is for example selected from the group consisting of calcium oxide, calcium hydroxide, calcium carbonate, calcium nitrate, calcium fluoride, calcium phosphate, calcium borate, and mixtures thereof. The silicon-containing additive material is for example selected from the group consisting of silica, quartz, silicates, volcanic ash, and mixtures thereof.

DESCRIPTION OF THE DRAWING

Figure 1:
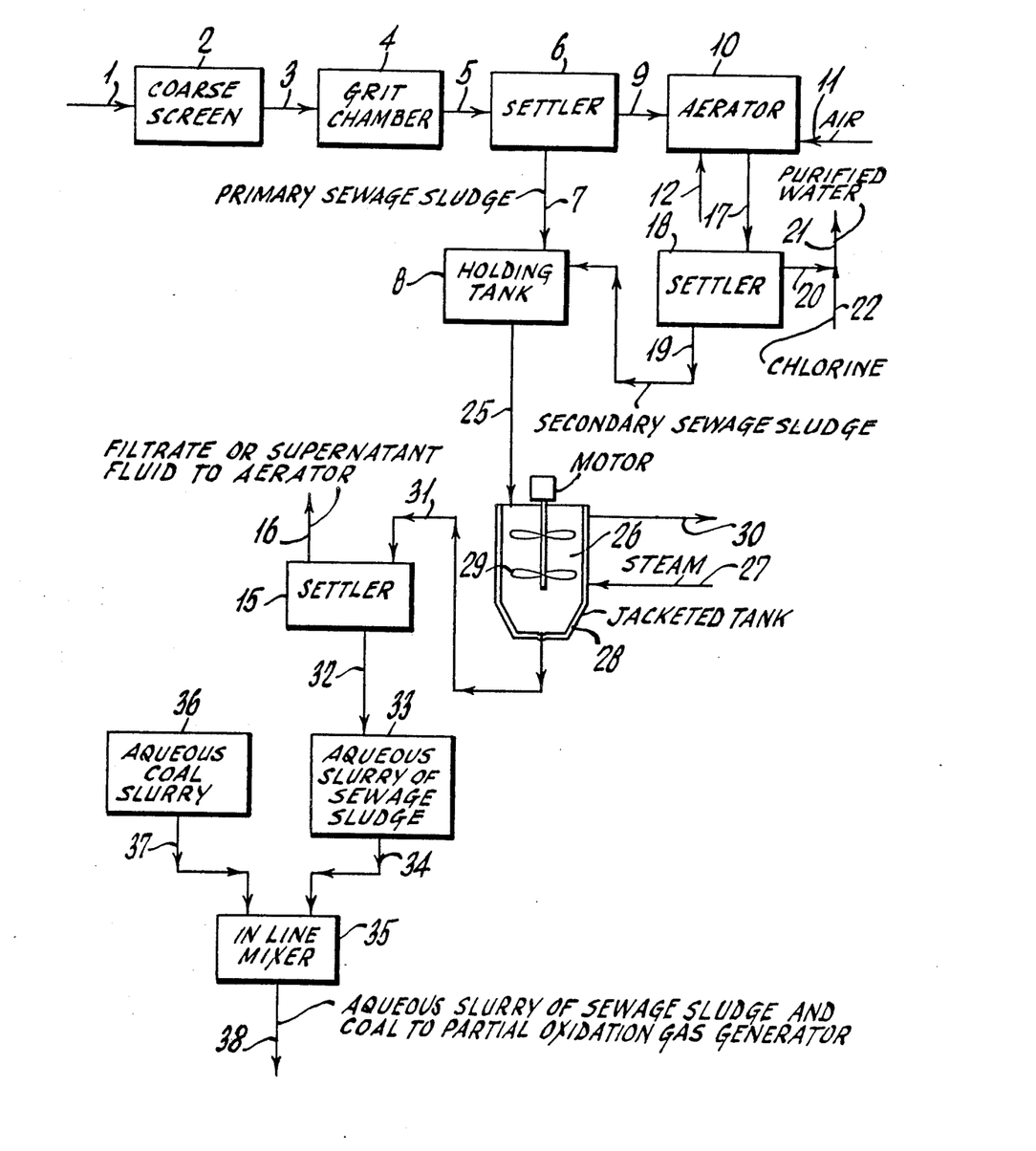

A more complete understanding of the invention may be had by reference to the accompanying drawing which illustrates a preferred embodiment of the invention. It is not intended to limit the subject invention to the particular process or materials described.

Municipal sanitary sewage in line 1 is passed through screening facility 2 where it is screened through bar screens having a ¾" or larger spacing, and is then passed through line 3 and grit chamber 4. Large objects and grit are thereby removed. Periodically, the large sized objects such as sticks, vegetables, grit, sand and stones are hauled away for use as land fill. The sewage is then passed through line 5 into primary sedimentation tank, settler or clarifier 6 where after settling, the primary sludge is removed through line 7 having an ultimate analysis as shown in Table II. The primary sludge is then introduced into holding tank 8.

Liquid overflow from the primary sedimentation tank 6 in line 9 is preferably processed to reduce the BOD and organic solids content, and to purify and optionally demineralize the water. For this, the liquid overflow stream in line 9 is introduced into an aerated biochemical facility 10 along with air from line 11, and a stream of filtrate or supernatant fluid from line 12. The material from line 12 may be the filtrate or supernatant fluid from downstream filter or settler 15 by way of lines 16 and 12.

Biochemical decomposition of the organic matter in the influent takes place in aerator 10. The pH is preferably in the range of about 6–9. Thus, by the activated sludge process in aerator 10, the BOD may be reduced to less than 20 parts per million within about 2–4 hours. Settling of the treated liquor from line 17 takes place in sedimentation tank or clarifier 18. Secondary sewage sludge from the bottom of settler 18 is passed into holding tank 8 by way of line 19. The overflow water from settler 18 is passed through line 20 and disinfected in line 21 with chlorine from line 22. Another advantage of combining gasification with sewage treatment occurs when the effluent water in line 20 is disinfected with a waste heat stream derived in the process. Savings on alternate methods of disinfecting the water including chlorinating, treating with ultraviolet light, and combinations thereof is thereby effected Optionally, the water may be deionized and/or filtered The primary sewage sludge, or alternatively the mixture of primary and secondary sewage sludge from holding tank 8 is passed through line 25 into steam jacketed tank 26. There the sewage sludge is heated to a temperature in the range of about 200° F. to 600° F. and a pressure equal to or above the vapor pressure of water at said elevated temperature for a period of about ¼ to 2 hours, until a large portion e.g. 50 to 100 wt. % or substantially all of the organic matter is agglomerated. Heat may be provided by introducing steam from line 27 into steam jacket 28. Alternatively, the steam may be introduced in direct contact with the sewage sludge in tank 26. Preferably, the steam is produced downstream in the process in a waste heat boiler or by indirect heat exchange between boiler feed water and the raw effluent gas stream from the partial oxidation synthesis gas generator. Alternatively, hot quench water produced by cooling the hot effluent gas stream in a quench tank downstream from the partial oxidation reaction zone may be used to heat the slurry in tank 26. Preferably, the tank is equipped with a conventional shearing device 29 e.g. motorized or static mixer to provide a minimum shear of about 1000 per minute during the heating period.

The pressure in tank 26 is maintained above the vapor pressure of water at the temperature prevailing within tank 26. Shearing plus heating allows the percent sewage sludge and the total solids in the slurry to be increased. Odorous gases may be removed from tank 26 and may be sent to a wet scrubber or other conventional odor control unit. The offgases may be burned in an incinerator.

A pumpable agglomerated sewage sludge slurry may be thereby produced in tank 26. This pumpable sewage sludge slurry is passed through line 31 into a dewatering means 15 e.g. filter or settler. A pumpable aqueous sewage sludge slurry is passed through line 32 and into holding tank 33 having a solids content in the range of about 25 to 50 wt %.

The aqueous slurry of sewage sludge in tank 33 is passed through line 34 and into in-line static mixer 35 where it is mixed with an aqueous coal and/or petroleum coke slurry from holding tank 36 and line 37. An aqueous sewage sludge-coal and/or petroleum coke slurry leaves mixer 35 through line 38 having a solids content in the range of about 30 to 65 wt. % and is introduced into a conventional, entrained flow, down-flowing, free-flow, vertical, non-catalytic, refractory lined, partial oxidation gas generator for the production of synthesis gas, reducing gas, or fuel gas. Alternatively, in-line mixer 35 may be replaced by a grinder. In such case, coal and/or petroleum coke may be introduced through line 37 and ground together with the aqueous slurry of sewage sludge from line 34.

The process of the invention has been described generally and by examples with reference to materials of particular composition for purposes of clarity and illustration only. It will be apparent to those skilled in the art from the foregoing that various modifications of the process and materials disclosed herein can be made without departure from the spirit of the invention.

We claim:

1. A process for the partial oxidation of sewage sludge the improvement:
   (1) heating a concentrated aqueous slurry of sewage sludge obtained from sewage and comprising combustible and non-combustible materials and having a solids content of at least 3 wt. % in the absence of air at a temperature in the range of about 200° to 600° F. and at a pressure at or above the vapor pressure of water at said elevated temperature until a large portion of the organic matter in said sewage is agglomerated;
   (2) dewatering the heated aqueous pumpable slurry of sewage sludge from (1) to a solids content in the range of about 25 to 50 wt. %;
   (3) mixing the pumpable aqueous slurry of sewage sludge produced in (2) having a higher heating value (HHV) of at least 3,000 Btu/lb (dry basis) with a supplemental solid fuel comprising particles of coal and/or petroleum coke having a higher heating value (HHV) of at least about 8,000 Btu/lb (dry basis) to produce a pumpable aqueous sewage sludge-coal and/or petroleum coke slurry having a solids content in the range of about 30 to 65 wt. %, and having a higher heating value (HHV) of at least about 6,000 Btu/lb (dry basis); and
   (4) reacting said pumpable aqueous sewage sludge-coal and/or petroleum coke slurry from (3) in the reaction zone of a partial oxidation gas generator at a temperature in the range of about 1800° F. to 2800° F. and a pressure in the range of about 1-35 atmospheres, and in the presence of a free-oxygen containing gas, thereby producing a hot raw effluent stream of synthesis gas, reducing gas or fuel gas.

2. The process of claim 1 provided with the step of shearing said aqueous slurry of sewage sludge in (1) at a shear rate of at least 1000 per minute for a period of about ¼ hr. to 2 hrs. while said aqueous slurry of sewage sludge is being heated.

3. The process of claim 1 wherein said supplemental solid fuel is coal and provided with the steps of encapsulating the non-combustible materials in the sewage sludge in (1) by ash contained in said coal, and flowing the encapsulated material from the reaction zone of the gas generator in (4) as substantially inert molten slag.

4. The process of claim 1 provided with the step of heating said aqueous slurry of sewage sludge in (1) by indirect heat exchange with hot quench water or steam produced downstream in the process during the cooling of the hot raw effluent gas stream from (4).

5. The process of claim provided with the steps of producing high quality or superheated steam by indirect heat exchange between boiler feedwater and said hot effluent gas stream from (4) in a waste heat boiler, introducing said steam into a steam turbine to produce mechanical power and/or electricity, and heating said aqueous slurry of sewage sludge in (1) by indirect heat exchange with low quality discharge steam from said steam turbine.

6. The process of claim 4 provided with the step of producing said hot quench water by direct heat exchange between water in a quench tank located downstream from said partial oxidation gas generator and said hot raw effluent gas stream from (4).

7. The process of claim 1 provided with the step of introducing said hot raw effluent gas stream from (4) into a
   gas purification zone and removing $H_2S$, COS, and $CO_2$ from said effluent gas stream.

8. The process of claim 1 provided with the step of dewatering the heated aqueous pumpable slurry of sewage sludge from (1) in (2) by gravity settling or filtration.

9. The process of claim 1 wherein the mixing in (3) takes place in a mixing zone wherein a pumpable aqueous slurry of sewage sludge having a solids content in the range of about 25 to 50 wt. % is mixed with a pumpable aqueous coal and/or petroleum coke slurry having a solids content in the range of about 10 to 75 wt. %; and wherein the wt. % of sewage sludge in said aqueous sewage sludge—coal and/or petroleum coke slurry is in the range of about 10 to 30.

10. The process of claim 1 wherein the mixing in (3) takes place in a grinder, and the solids in said pumpable aqueous sewage sludge-coal and/or petroleum coke slurry and the particles of coal and/or petroleum coke in said supplemental fuel are ground to a particle size so that 100% passes through an ASTM E11-70 Sieve Designation Standard (SDS) 1.40 mm Alternative No. 14.

11. The process of claim 1 provided with the step of introducing an additive into the reaction zone of (4) in order to facilitate the encapsulation of said non-combustible materials in the sewage sludge and in the ash of the supplemental fuel.

12. The process of claim 11 wherein said additive is selected from the group consisting of iron-containing materials, calcium-containing materials, silicon-containing materials, and mixture thereof.

13. The process of claim 12 wherein said iron-containing material is selected from the group consisting of iron, iron oxide, iron carbonate, iron nitrate, and mixtures thereof; said calcium-containing material is selected from the group consisting of calcium oxide, calcium hydroxide, calcium carbonate, calcium nitrate, calcium fluoride, calcium phosphate, calcium borate, and mixtures thereof; and said silicon-containing additive material is selected from the group consisting of silica, silicates, quartz, volcanic ash, and mixtures thereof.

14. The process of claim 1 provided with the steps of aerating the water removed from sewage to produce said concentrated aqueous slurry of sewage sludge in (1), separating the aerated material into an aqueous slurry of secondary sewage sludge and water overflow, disinfecting the water overflow, and mixing the aqueous slurry of secondary sludge with the concentrated aqueous slurry of sewage sludge to be processed in (1).

15. The process of claim 14 provided with the steps of disinfecting said water overflow by a conventional process step selected from the group consisting of chlorinating, heating with waste heat derived in the process, treating with ultra violet light, or combinations thereof.

16. The process of claim 14 provided with the steps of removing dissolved solids from said disinfected water and passing the upgraded disinfected water in indirect heat exchange with the effluent gas stream from the partial oxidation reaction zone to produce steam, and heating the concentrated aqueous slurry of sewage sludge in (1) by indirect heat exchange with said steam.

17. The process of claim 16 provided with the steps of quench cooling the hot raw effluent gas stream from (4) with at least a portion of said disinfected water thereby producing hot quench water, and heating the concentrated aqueous slurry of sewage sludge in (1) by indirect heat exchange with said hot quench water.

18. The process of claim 1 provided with the step of introducing said pumpable aqueous sewage sludge coal and/or petroleum coke slurry from (3) into the reaction zone of the partial oxidation gas generator in (4) by way of the intermediate annular shaped passage of an annular-type burner comprising a central conduit surrounded by two concentric annular shaped passages while simultaneously passing free-oxygen containing gas through the central conduit and outer annular shaped passage.

19. The process of claim 1 where in (3) said supplemental solid fuel is coal is selected from the group consisting of anthracite, bituminous, subbituminous, coke from coal, lignite, residue derived from coal liquifaction, and mixtures thereof.

20. The process of claim 1 wherein said coal and/or petroleum coke is provided as a pumpable slurry of coal and/or petroleum coke in a liquid medium selected from the group consisting of water, liquid hydrocarbon, liquid hydrocarbonaceous fuel, and mixtures thereof.

21. A process for the partial oxidation of sewage sludge comprising:
    (1) heating a concentrated aqueous slurry of sewage sludge comprising combustible and non-combustible materials and having a solids content in the range of at least 3 wt. % in the absence of air at a temperature in the range of about 200° to 600° F. and at a pressure at or above the vapor pressure of water at said elevated temperature until a large portion of the organic matter in said sewage is agglomerated;
    (2) dewatering the heated pumpable aqueous slurry of sewage sludge from (1) to a solids content in the range of about 25 to 50 wt. %;
    (3) mixing the pumpable aqueous slurry of sewage sludge produced in (2) having a higher heating value (HHV) of at least 3,000 Btu/lb (dry basis) with a supplemental fuel comprising a liquid hydrocarbon or a liquid hydrocarbonaceous fuel having a higher heating value (HHV) of at least about 10,000 Btu/lb to produce a pumpable feed slurry having a solids content in the range of about 30 to 65 wt. %, and having a higher heating value (HHV) of at least about 6,000 Btu/lb (dry basis); and
    (4) reacting said pumpable feed slurry from (3) in the reaction zone of a partial oxidation gas generator at a temperature in the range of about 1800° F. to 2800° F. and a pressure in the range of about 1-35 atmospheres, and in the presence of a free-oxygen containing gas, thereby producing a hot raw effluent stream of synthesis gas, reducing gas or fuel gas.

22. The process of claim 21 provided with the step of shearing said aqueous slurry of sewage sludge in (1) at a shear rate of at least 1000 per minute for a period of about ¼ hr to 2 hrs. while said aqueous slurry of sewage sludge is being heated.

23. The process of claim 21 provided with the step of heating said aqueous slurry of sewage sludge in (1) by indirect heat exchange with hot quench water or steam produced downstream in the process during the cooling of the hot raw effluent gas stream from (4).

24. The process of claim 21 provided with the step of introducing said hot raw effluent gas stream from (4) into a gas purification zone and removing $H_2S$, COS, and $CO_2$ from said effluent gas stream.

25. The process of claim 21 provided with the step of introducing an additive into the reaction zone of (4) in order to facilitate the encapsulation of said non-combustible materials in the sewage sludge and in the ash of the supplemental fuel.

26. The process of claim 25 wherein said additive is selected from the group consisting of iron-containing materials, calcium-containing materials, silicon-containing materials, and mixtures thereof.

27. The process of claim 21 provided with the steps of aerating the water removed from sewage to produce said concentrated aqueous slurry of sewage sludge in (1), separating the aerated material into an aqueous slurry of secondary sewage sludge and water overflow, purifying the water overflow, and mixing the aqueous slurry of secondary sludge with the concentrated aqueous slurry of sewage sludge to be processed in (1).

28. The process of claim 27 provided with the step of passing said purified water in indirect heat exchange with the effluent gas stream from the partial oxidation reaction zone to produce steam, and heating the concentrated aqueous slurry of sewage sludge in (1) by indirect heat exchange with said steam.

29. The process of claim 27 provided with the steps of quench cooling the hot raw effluent gas stream from (4) with at least a portion of said purified water thereby producing hot quench water, and heating the concentrated aqueous slurry of sewage sludge in (1) by indirect heat exchange with said hot quench water.

30. The process of claim 21 provided with the step of introducing said pumpable feed slurry from (3) into the reaction zone of the partial oxidation gas generator in (4) by way of the intermediate annular shaped passage of an annular-type burner comprising a central conduit surrounded by two concentric annular-shaped passages while simultaneously passing free-oxygen containing gas through the central conduit and the outer annular shaped passage.

31. The process of claim 21 wherein said liquid hydrocarbonaceous fuel is selected from the group consisting of virgin crude, residue from petroleum distillation and cracking, petroleum distillates, reduced crude, asphalt, coal tar, shale oil, tar sand oil, and mixtures thereof.

32. A process for the partial oxidation of sewage sludge comprising:
    (1) heating a concentrated aqueous slurry of sewage sludge obtained from sewage and comprising combustible and non-combustible materials and having a solids content of at least 3 wt. % in the absence of air at a temperature in the range of about 200° to 600° F. and at a pressure at or above the vapor pressure of water at said elevated temperature until a large portion of the organic matter in said sewage is agglomerated;
    (2) dewatering the heated aqueous pumpable slurry of sewage sludge from (1) to a solids content in the range of about 25 to 50 wt. %;

(3) mixing the pumpable slurry of sewage sludge produced in (2) having a higher heating value (HHV) of at least 3,000 Btu/lb (dry basis) with a supplemental fuel comprising a gaseous fuel having a higher heating value (HHV) of at least about 75 BTU per Standard Cubic Foot (SCF) to produce a dispersion of sewage sludge in gaseous fuel, wherein said dispersion has a higher heating value (HHV) of at least 300 BTU/SCF; and (4) reacting said atomized dispersion from (3) in the reaction zone of a partial oxidation gas generator at a temperature in the range of about 1800° F. to 2800° F. and a pressure in the range of about 1-35 atmospheres, and in the presence of a free-oxygen containing gas, thereby producing a hot raw effluent stream of synthesis gas, reducing gas or fuel gas.

33. The process of claim 32 provided with the step of shearing said aqueous slurry of sewage sludge in (1) at a shear rate of at least 1000 per minute for a period of about ¼ to 2 hrs. while said aqueous slurry of sewage sludge is being heated.

34. The process of claim 32 with the step of heating said aqueous slurry of sewage sludge in (1) by indirect heat exchange with hot quench water or steam produced downstream in the process during the cooling of the hot raw effluent gas stream from (4).

35. The process of claim 32 provided with the steps of introducing said hot raw effluent gas stream from (4) into a gas purification zone and removing $H_2S$, COS, and $CO_2$ from said effluent gas stream.

36. The process of claim 32 provided with the steps of aerating the water removed from sewage to produce said concentrated aqueous slurry of secondary sewage sludge in (1), separating the aerated material into an aqueous slurry of secondary sewage sludge and water overflow, purifying the water overflow, and mixing the aqueous slurry of secondary sludge with the concentrated aqueous slurry of sewage sludge to be processed in (1).

37. The process of claim 36 provided with the step of passing the purified water in indirect heat exchange with the effluent gas stream from the partial oxidation reaction zone to produce steam, and heating the concentrated aqueous slurry of sewage sludge in (1) by indirect heat exchange with said steam.

38. The process of claim 36 provided with the steps of quench cooling the hot raw effluent gas stream from the partial oxidation gas generator with at least a portion of said purified water thereby producing hot quench water, and heating the concentrated aqueous slurry of sewage sludge in (1) by indirect heat exchange with said hot quench water.

39. The process of claim 32 wherein said supplemental fuel is selected from the group consisting of natural gas, a portion of gas produced in the partial oxidation gas generator, and mixtures thereof.

40. The process of claim 32 provided with the step of introducing said dispersion of sewage sludge in gaseous fuel from (3) into the reaction zone of the partial oxidation gas generator in (4) by way of the intermediate annular shaped passage of an annular-type burner comprising a central conduit surrounded by two concentric annular shaped passages while simultaneously passing free-oxygen containing gas through the central conduit and the outer annular shaped passage.

41. The process of claim 32 wherein the mixing in (3) is produced by passing said aqueous pumpable slurry of sewage sludge from (2) through the intermediate annular shaped passage of an annular-type burner comprising a central conduit surrounded by two concentric annular shaped passages while simultaneously passing a stream of free-oxygen containing gas through the central conduit or the outer annular shaped passage, and passing a separate stream of fuel gas through the remaining conduit.

* * * * *